(12) United States Patent    (10) Patent No.:   US 12,627,708 B2

Kim et al.    (45) Date of Patent:   May 12, 2026

(54) SYSTEMS, METHODS, AND APPARATUSES FOR DETECTION OF DATA MISAPPROPRIATION ATTEMPTS ACROSS ELECTRONIC COMMUNICATION PLATFORMS

(71) Applicant: BANK OF AMERICA CORPORATION, Charlotte, NC (US)

(72) Inventors: Jinna Zevulun Kim, Charlotte, NC (US); Katherine Kei-Zen Dintenfass, Lincoln, RI (US); Jo-Ann Taylor, Godalming (GB); Christine D. Black, Brooksville, ME (US); Jennifer Tiffany Renckert, Middleburg, FL (US); Vijaya L. Vemireddy, Plano, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 315 days.

(21) Appl. No.: 17/981,743

(22) Filed: Nov. 7, 2022

(65) Prior Publication Data

US 2024/0155000 A1    May 9, 2024

(51) Int. Cl.
*H04L 9/40*      (2022.01)
*G06F 40/205*    (2020.01)

(52) U.S. Cl.
CPC ........ *H04L 63/1483* (2013.01); *G06F 40/205* (2020.01); *H04L 63/1416* (2013.01)

(58) Field of Classification Search
None
See application file for complete search history.

(56) References Cited

U.S. PATENT DOCUMENTS

| | | | |
|---|---|---|---|
| 9,270,696 B2 | 2/2016 | Fritzson | |
| 9,356,947 B2 | 5/2016 | Shraim | |
| 9,635,052 B2 | 4/2017 | Hadnagy | |
| 9,684,888 B2 | 6/2017 | Shraim | |
| 9,787,714 B2 | 10/2017 | Bach | |
| 10,033,693 B2 | 7/2018 | Sengupta | |
| 10,158,677 B1 | 12/2018 | DiCorpo | |
| 10,193,923 B2 | 1/2019 | Wright | |
| 10,277,628 B1 * | 4/2019 | Jakobsson | ........... H04L 63/1483 |
| 10,404,745 B2 | 9/2019 | Verma | |

(Continued)

FOREIGN PATENT DOCUMENTS

EP      1999609 B1    3/2018

*Primary Examiner* — Khang Do

(74) *Attorney, Agent, or Firm* — Moore & Van Allen PLLC; Lauren M. Stokes

(57) ABSTRACT

Systems, computer program products, and methods are described herein for detection of data misappropriation attempts across electronic communication platforms. The present invention is configured to identify a recipient user account, wherein the recipient user account has received a current communication; parse the current communication to identify at least one order for the recipient user account; identify at least one potential outcome based on the at least one order for the recipient user account; determine the potential outcome comprises a misappropriation; apply a misappropriation attempt engine to the current communication; and generate, by the misappropriation attempt engine, a misappropriation attempt rating for the current communication.

19 Claims, 9 Drawing Sheets

(56) References Cited

U.S. PATENT DOCUMENTS

| | | | | |
|---|---|---|---|---|
| 10,574,684 | B2 | 2/2020 | Segal | |
| 10,708,297 | B2 * | 7/2020 | Woods | G06F 16/9566 |
| 10,805,314 | B2 | 10/2020 | Jakobsson | |
| 10,868,820 | B2 | 12/2020 | Sites | |
| 10,924,517 | B2 | 2/2021 | Epple | |
| 10,944,789 | B2 | 3/2021 | Correa Bahnsen | |
| 10,992,780 | B1 * | 4/2021 | Rudrappa Goniwada | H04L 67/34 |
| 11,044,267 | B2 | 6/2021 | Jakobsson | |
| 11,159,558 | B2 | 10/2021 | Basavapatna | |
| 11,431,738 | B2 * | 8/2022 | Jeyakumar | G06N 20/20 |
| 11,936,604 | B2 * | 3/2024 | Jakobsson | H04L 63/1408 |
| 12,074,898 | B1 * | 8/2024 | Diao | H04L 63/1433 |
| 2007/0061125 | A1 * | 3/2007 | Bhatt | H04L 63/0227 703/23 |
| 2007/0078936 | A1 * | 4/2007 | Quinlan | G06Q 10/107 709/206 |
| 2011/0252043 | A1 * | 10/2011 | Webb-Johnson | H04L 51/212 707/748 |
| 2012/0185611 | A1 * | 7/2012 | Reynolds | G06Q 50/265 709/246 |
| 2012/0278887 | A1 * | 11/2012 | Vitaldevara | H04L 63/1441 726/23 |
| 2016/0014151 | A1 * | 1/2016 | Prakash | H04L 47/62 726/22 |
| 2016/0105396 | A1 * | 4/2016 | Hastings | H04L 63/08 726/11 |
| 2017/0063920 | A1 | 3/2017 | Thomas | |
| 2017/0180398 | A1 * | 6/2017 | Gonzales, Jr. | H04L 63/1416 |
| 2018/0091453 | A1 * | 3/2018 | Jakobsson | H04L 63/1483 |
| 2018/0227324 | A1 * | 8/2018 | Chambers | H04W 12/128 |
| 2018/0253659 | A1 * | 9/2018 | Lee | H04L 51/42 |
| 2019/0020671 | A1 * | 1/2019 | Komárek | G06F 21/552 |
| 2019/0068616 | A1 * | 2/2019 | Woods | H04L 63/145 |
| 2019/0199745 | A1 * | 6/2019 | Jakobsson | H04L 63/1483 |
| 2019/0238571 | A1 * | 8/2019 | Adir | H04L 63/1425 |
| 2019/0244175 | A1 * | 8/2019 | Ogrinz | G06Q 10/063 |
| 2019/0281056 | A1 * | 9/2019 | Kursun | G06N 3/02 |
| 2019/0311277 | A1 * | 10/2019 | Kursun | G06N 3/08 |
| 2020/0012917 | A1 * | 1/2020 | Pham | G06N 3/04 |
| 2020/0068031 | A1 * | 2/2020 | Kursun | H04W 24/02 |
| 2020/0211076 | A1 * | 7/2020 | Eakin | G06Q 10/10 |
| 2020/0216027 | A1 * | 7/2020 | Deng | H04L 63/1416 |
| 2020/0311265 | A1 | 10/2020 | Jones | |
| 2020/0344251 | A1 * | 10/2020 | Jeyakumar | H04L 51/212 |
| 2020/0349573 | A1 * | 11/2020 | Dong | G06N 5/022 |
| 2020/0358820 | A1 * | 11/2020 | Kolingivadi | H04L 63/1433 |
| 2021/0075805 | A1 * | 3/2021 | Cavallari | G06N 3/088 |
| 2021/0185078 | A1 | 6/2021 | Sjouwerman | |
| 2021/0266345 | A1 * | 8/2021 | Chen | H04L 63/1425 |
| 2021/0329015 | A1 * | 10/2021 | Devane | H04L 63/145 |
| 2022/0094713 | A1 * | 3/2022 | Lee | G06F 18/214 |
| 2022/0116420 | A1 * | 4/2022 | Weber | H04L 63/1425 |
| 2022/0279015 | A1 * | 9/2022 | Sambamoorthy | H04L 51/212 |
| 2022/0400094 | A1 * | 12/2022 | Sampath | G06F 40/30 |
| 2023/0025446 | A1 * | 1/2023 | Freire | G06F 40/30 |
| 2023/0171212 | A1 * | 6/2023 | Hathaway | H04L 63/12 709/206 |
| 2023/0179628 | A1 * | 6/2023 | Porras | G06F 40/30 726/22 |
| 2023/0273843 | A1 * | 8/2023 | Srivastava | G06F 13/36 719/313 |
| 2024/0046397 | A1 * | 2/2024 | McCurry | G06F 21/6245 |
| 2024/0056477 | A1 * | 2/2024 | Rangwala | H04L 63/1416 |
| 2024/0155000 | A1 * | 5/2024 | Kim | H04L 63/1416 |
| 2024/0179159 | A1 * | 5/2024 | Hulcoop | H04L 63/1416 |
| 2024/0223594 | A1 * | 7/2024 | Picard | H04L 63/1433 |
| 2025/0274467 | A1 * | 8/2025 | Francisco | H04L 63/08 |

* cited by examiner

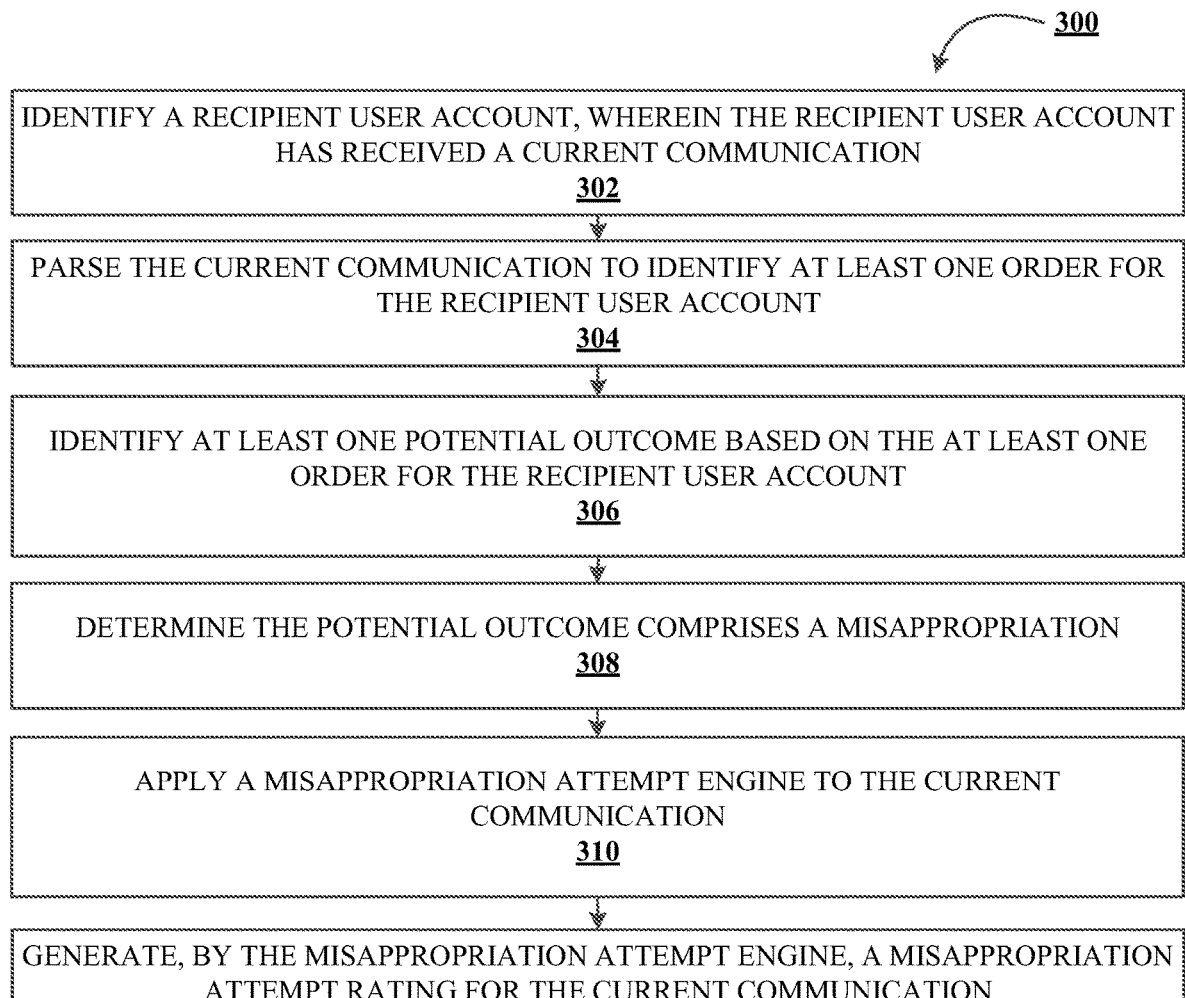

300

IDENTIFY A RECIPIENT USER ACCOUNT, WHEREIN THE RECIPIENT USER ACCOUNT
HAS RECEIVED A CURRENT COMMUNICATION
302

PARSE THE CURRENT COMMUNICATION TO IDENTIFY AT LEAST ONE ORDER FOR
THE RECIPIENT USER ACCOUNT
304

IDENTIFY AT LEAST ONE POTENTIAL OUTCOME BASED ON THE AT LEAST ONE
ORDER FOR THE RECIPIENT USER ACCOUNT
306

DETERMINE THE POTENTIAL OUTCOME COMPRISES A MISAPPROPRIATION
308

APPLY A MISAPPROPRIATION ATTEMPT ENGINE TO THE CURRENT
COMMUNICATION
310

GENERATE, BY THE MISAPPROPRIATION ATTEMPT ENGINE, A MISAPPROPRIATION
ATTEMPT RATING FOR THE CURRENT COMMUNICATION
312

FIGURE 3

COLLECT A SET OF PREVIOUS THREAT COMMUNICATIONS, WHEREIN THE SET OF PREVIOUS THREAT COMMUNICATIONS COMPRISE AT LEAST ONE BACKGROUND TACTIC TYPE
402

CREATE A BACKGROUND TACTIC TRAINING SET COMPRISING THE COLLECTED SET OF PREVIOUS THREAT COMMUNICATIONS
404

TRAIN THE MISAPPROPRIATION ATTEMPT ENGINE USING THE BACKGROUND TACTIC TRAINING SET
406

RECEIVE AT LEAST ONE CURRENT BACKGROUND TACTIC TYPE ASSOCIATED WITH THE CURRENT COMMUNICATION
408

APPLY THE AT LEAST ONE CURRENT BACKGROUND TACTIC TYPE TO THE MISAPPROPRIATION ATTEMPT ENGINE
410

GENERATE, BY THE MISAPPROPRIATION ATTEMPT ENGINE, THE MISAPPROPRIATION ATTEMPT RATING OF THE CURRENT COMMUNICATION BASED ON THE AT LEAST ONE BACKGROUND TACTIC TYPE
412

FIGURE 4

500

COLLECT A SET OF PREVIOUS THREAT COMMUNICATIONS, WHEREIN THE SET OF PREVIOUS THREAT COMMUNICATIONS COMPRISE AT LEAST ONE PREVIOUS ORDER AND AT LEAST ONE PREVIOUS OUTCOME
502

CREATE A PREVIOUS OUTCOME TRAINING DATA SET COMPRISING THE COLLECTED SET OF PREVIOUS THREAT COMMUNICATIONS
504

TRAIN THE MISAPPROPRIATION ATTEMPT ENGINE USING THE PREVIOUS OUTCOME TRAINING DATA SET
506

FIGURE 5

600

COLLECT A SET OF PREVIOUS RECIPIENT ACCOUNT IDENTIFIERS ASSOCIATED WITH A SET OF PREVIOUS THREAT COMMUNICATIONS
602

CREATE A RECIPIENT ACCOUNT THREAT TRAINING DATA SET COMPRISING THE COLLECTED SET OF PREVIOUS RECIPIENT ACCOUNT IDENTIFIERS
604

TRAIN THE MISAPPROPRIATION ATTEMPT ENGINE USING THE RECIPIENT ACCOUNT THREAT TRAINING DATA SET
606

IDENTIFY A CURRENT RECIPIENT ACCOUNT IDENTIFIER BASED ON THE RECIPIENT USER ACCOUNT ASSOCIATED WITH THE CURRENT COMMUNICATION
608

APPLY THE CURRENT RECIPIENT ACCOUNT IDENTIFIER TO THE MISAPPROPRIATION ATTEMPT ENGINE
610

GENERATE, BY THE MISAPPROPRIATION ATTEMPT ENGINE, THE MISAPPROPRIATION ATTEMPT RATING OF THE CURRENT COMMUNICATION BASED ON THE CURRENT RECIPIENT ACCOUNT IDENTIFIER
612

FIGURE 6

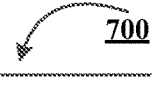

700

COLLECT A SET OF PREVIOUS UNVERIFIED SENDER ACCOUNT IDENTIFIERS ASSOCIATED WITH A SET OF PREVIOUS THREAT COMMUNICATIONS
702

CREATE A SENDER ACCOUNT THREAT TRAINING DATA SET COMPRISING THE COLLECTED SET OF PREVIOUS UNVERIFIED SENDER ACCOUNT IDENTIFIERS
704

TRAIN THE MISAPPROPRIATION ATTEMPT ENGINE USING THE SENDER ACCOUNT THREAT TRAINING DATA SET
706

IDENTIFY A CURRENT UNVERIFIED SENDER ACCOUNT IDENTIFIER ASSOCIATED WITH THE CURRENT COMMUNICATION
708

TRANSMIT AN AUTHENTICATION REQUEST TO A VERIFIED SENDER USER ACCOUNT ASSOCIATED WITH THE UNVERIFIED SENDER ACCOUNT IDENTIFIER
710

RECEIVE AN AUTHENTICATION RESPONSE FROM THE VERIFIED SENDER USER ACCOUNT
712

GENERATE, BASED ON THE AUTHENTICATION RESPONSE FROM THE VERIFIED SENDER USER ACCOUNT, A MISAPPROPRIATION ATTEMPT RATING OF THE CURRENT COMMUNICATION
714

FIGURE 7

SYSTEMS, METHODS, AND APPARATUSES FOR DETECTION OF DATA MISAPPROPRIATION ATTEMPTS ACROSS ELECTRONIC COMMUNICATION PLATFORMS

FIELD OF THE INVENTION

The present invention embraces a system for detection of data misappropriation attempts across electronic communication platforms.

BACKGROUND

Users who have user accounts and managers of those user accounts may wish to make sure data associated with the user accounts are not breached or misappropriated. For instance, managers and users associated with the user accounts may have difficulty discerning when a misappropriation attempt is occurring (e.g., by way of electronic communication such as emails, text messages, voicemails, phone calls, and/or the like) and may wish to accurately, efficiently, and dynamically track each communication and determine whether any of the electronic communications may likely lead to the misappropriation of data, identities, user accounts, and/or the like. However, difficulty may arise where the misappropriation attempts comprise social engineering tactics to get the recipient (e.g., the users associated with the user accounts) to believe the sender of the electronic communication should be trusted. A need, therefore, exists, for a system to accurately, efficiently, and dynamically detect misappropriation attempts across electronic communication platforms, such as those platforms used in sending verbal electronic communications and/or electronic message communications.

Applicant has identified a number of deficiencies and problems associated with the detection of data misappropriation attempts across electronic communication platforms. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for detection of data misappropriation attempts across electronic communication platforms is provided. The system may comprise: a memory device with computer-readable program code stored thereon; at least one processing device operatively coupled to the at least one memory device and the at least one communication device, wherein executing the computer-readable code is configured to cause the at least one processing device to: identify a recipient user account, wherein the recipient user account has received a current communication; parse the current communication to identify at least one order for the recipient user account; identify at least one potential outcome based on the at least one order for the recipient user account; determine the potential outcome comprises a misappropriation; apply a misappropriation attempt engine to the current communication; and generate, by the misappropriation attempt engine, a misappropriation attempt rating for the current communication.

In some embodiments, the current communication comprises at least one of a verbal electronic communication or an electronic message communication.

In some embodiments, the determination the potential outcome comprises a misappropriation further comprises an acceptance by the recipient user account of the at least one order of the current communication.

In some embodiments, the processing device is further configured to: collect a set of previous threat communications, wherein the set of previous threat communications comprise at least one background tactic type; create a background tactic training data set comprising the collected set of previous threat communications; and train the misappropriation attempt engine using the background tactic training data set. In some embodiments, the at least one background tactic type comprises at least one of a threat communication marker, a threat communication tone, a threat communication language, a threat communication noise, or a threat communication request type. In some embodiments, the processing device is further configured to: receive at least one current background tactic type associated with the current communication; apply the at least one current background tactic type to the misappropriation attempt engine; and generate, by the misappropriation attempt engine, the misappropriation attempt rating of the current communication based on the at least one current background tactic type.

In some embodiments, the processing device is further configured to: collect a set of previous threat communications, wherein the set of previous threat communications comprise at least one previous order and at least one previous outcome; create a previous outcome training data set comprising the collected set of previous threat communications; and train the misappropriation attempt engine with the previous outcome training data set.

In some embodiments, the processing device is further configured to: collect a set of previous recipient account identifiers associated with a set of previous threat communications; create a recipient account threat training data set comprising the collected set of previous recipient account identifiers; and train the misappropriation attempt engine using the recipient account threat training data set. In some embodiments, the processing device is further configured to: identify a current recipient account identifier based on the recipient user account associated with the current communication; apply the current recipient account identifier to the misappropriation attempt engine; and generate, by the misappropriation attempt engine, the misappropriation attempt rating of the current communication based on the current recipient account identifier.

In some embodiments, the processing device is further configured to: collect a set of previous unverified sender account identifiers associated with a set of previous threat communications; create a sender account threat training data set comprising the collected set of previous unverified sender account identifiers; and train the misappropriation attempt engine using the sender account threat training data set. In some embodiments, the processing device is further configured to: identify a current unverified sender account identifier associated with the current communication; transmit an authentication request to a verified sender user account associated with the unverified sender account identifier; receive an authentication response from the verified sender user account; and generate, based on the authentication response from the verified sender user account, a misappropriation attempt rating of the current communication. In some embodiments, the misappropriation attempt rating of the current communication comprises a high rating, in an instance the authentication response comprises a negative response. In some embodiments, the misappropriation attempt rating of the current communication comprises a low rating, in an instance the authentication response comprises a positive response.

In another aspect, a computer program product for detection of data misappropriation attempts across electronic communication platforms is provided. The computer program product may comprise at least one non-transitory computer-readable medium having computer-readable program code portions embodied therein, the computer-readable program code portions which when executed by a processing device are configured to cause the processor to: identify a recipient user account, wherein the recipient user account has received a current communication; parse the current communication to identify at least one order for the recipient user account; identify at least one potential outcome based on the at least one order for the recipient user account; determine the potential outcome comprises a misappropriation; apply a misappropriation attempt engine to the current communication; and generate, by the misappropriation attempt engine, a misappropriation attempt rating for the current communication.

In some embodiments, the current communication comprises at least one of a verbal electronic communication or an electronic message communication.

In some embodiments, the determination the potential outcome comprises a misappropriation further comprises an acceptance by the recipient user account of the at least one order of the current communication.

In some embodiments, the processing device is further configured to cause the processor to: collect a set of previous threat communications, wherein the set of previous threat communications comprise at least one background tactic type; create a background tactic training data set comprising the collected set of previous threat communications; and train the misappropriation attempt engine using the background tactic training data set.

In another aspect, a computer-implemented method for detection of data misappropriation attempts across electronic communication platforms is provided. The computer-implemented method comprising: identifying a recipient user account, wherein the recipient user account has received a current communication; parsing the current communication to identify at least one order for the recipient user account; identifying at least one potential outcome based on the at least one order for the recipient user account; determining the potential outcome comprises a misappropriation; applying a misappropriation attempt engine to the current communication; and generating, by the misappropriation attempt engine, a misappropriation attempt rating for the current communication.

In some embodiments, the current communication comprises at least one of a verbal electronic communication or an electronic message communication.

In some embodiments, the determination the potential outcome comprises a misappropriation further comprises an acceptance by the recipient user account of the at least one order of the current communication.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
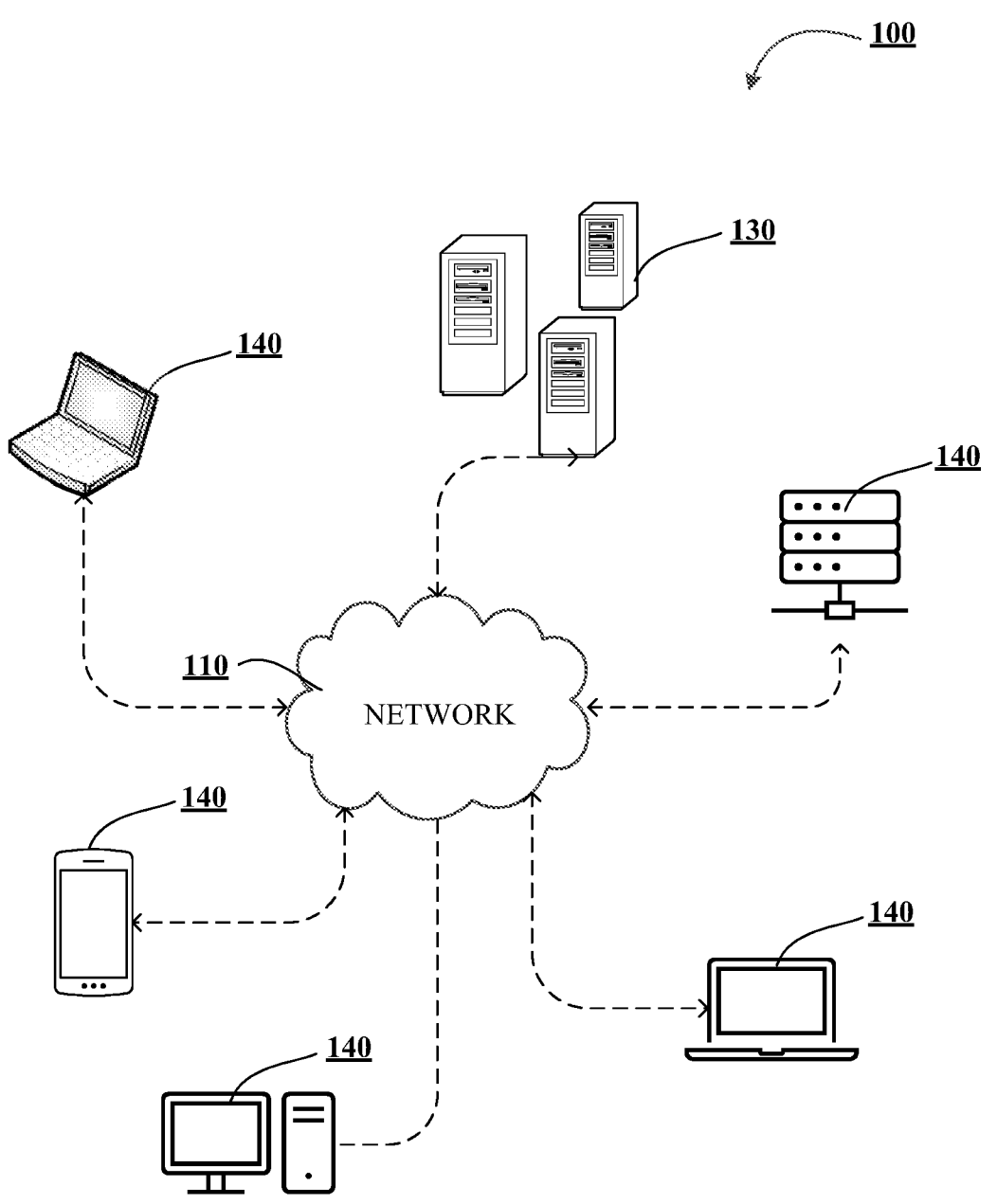
Figure 1B:
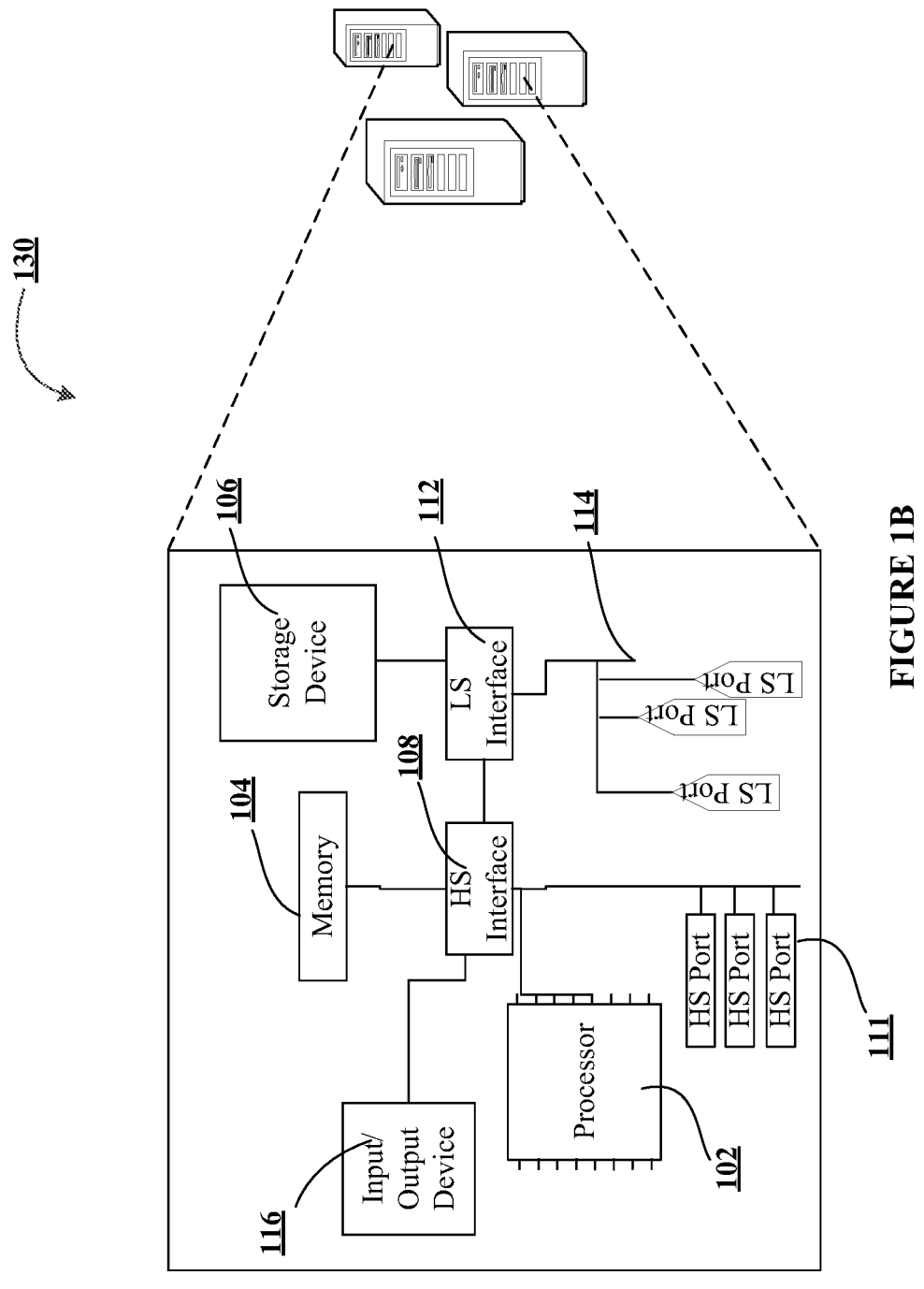
Figure 1C:
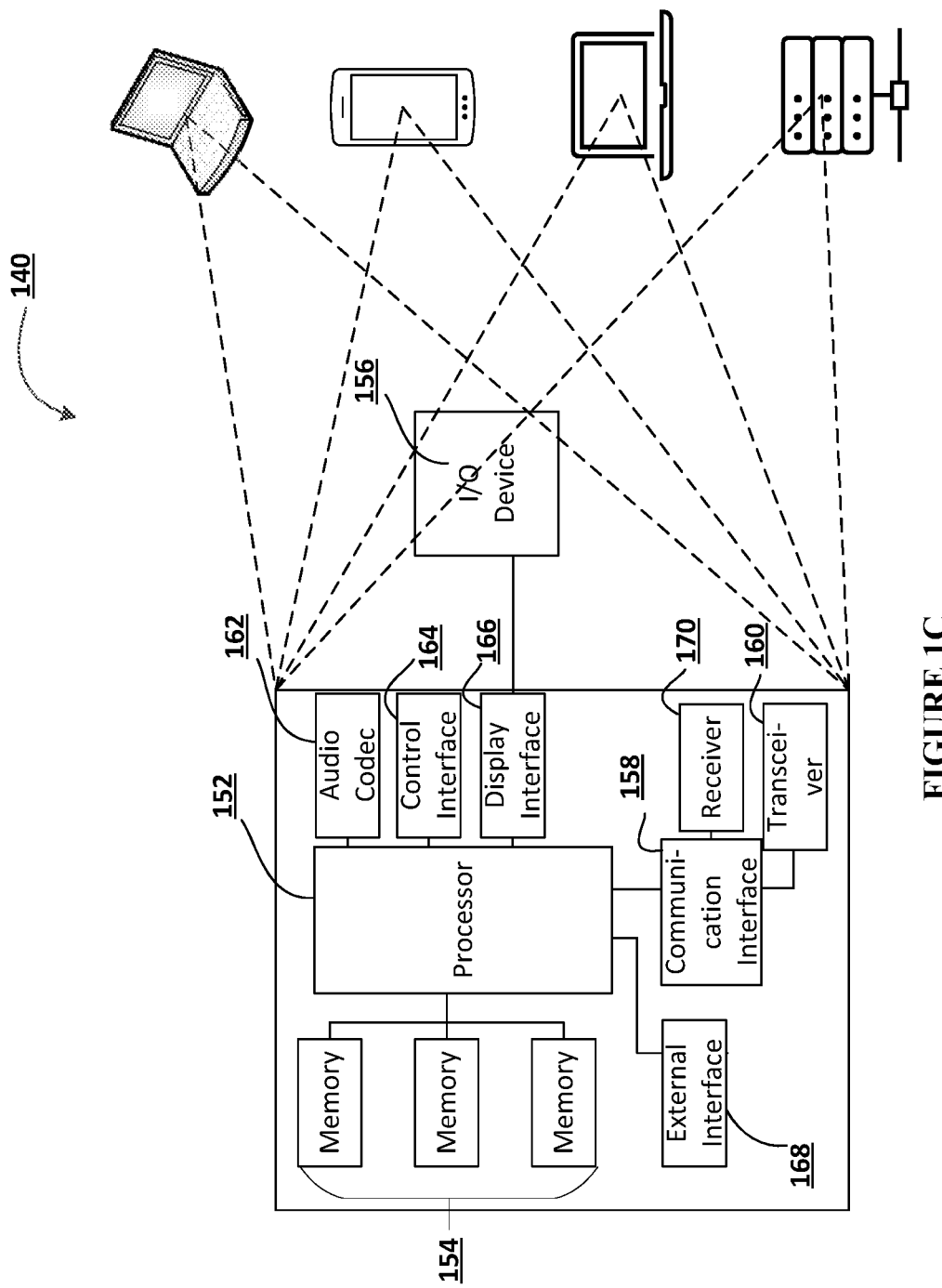
Figure 2:
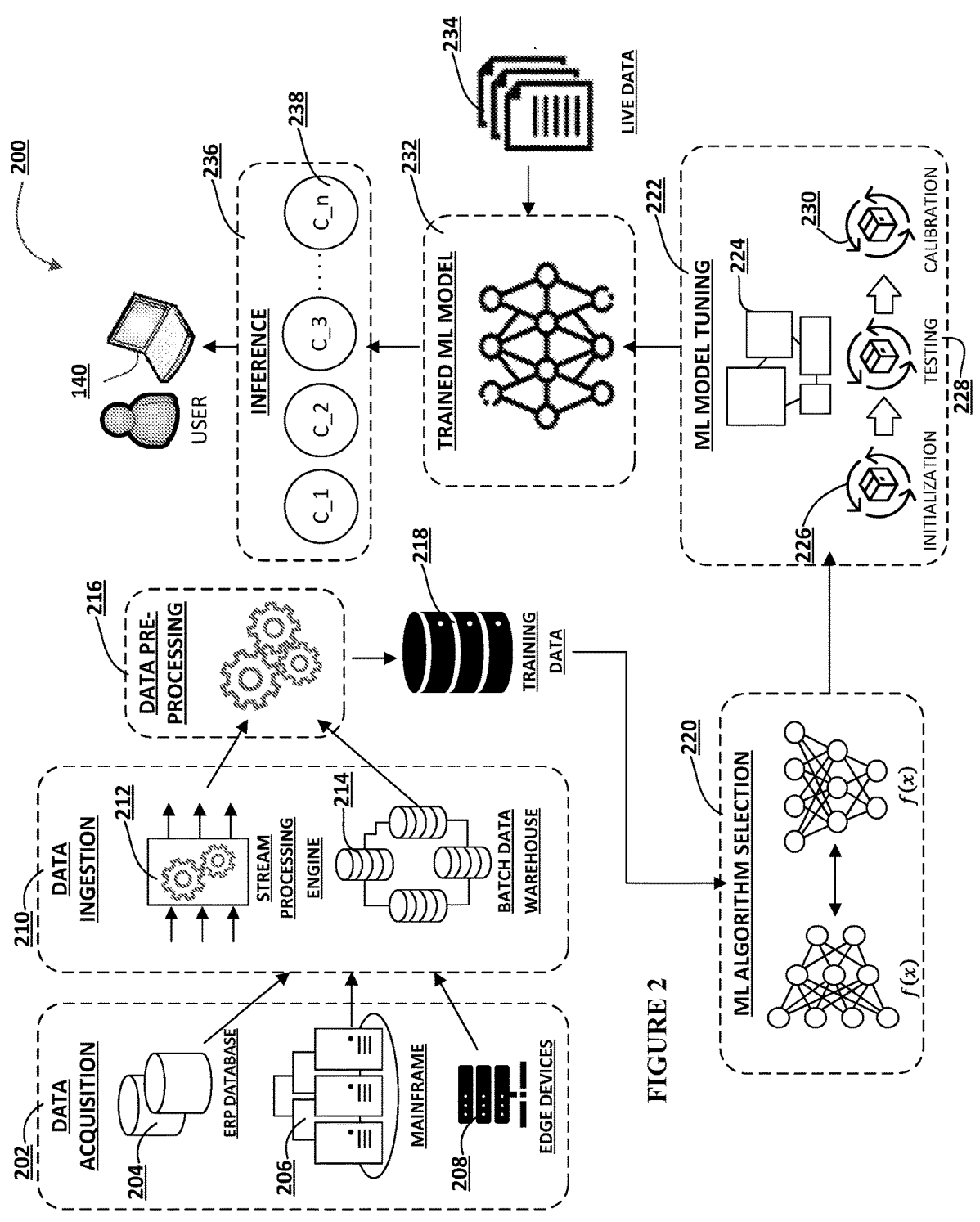

Having thus described embodiments of the invention in general terms, reference will now be made the accompanying drawings, wherein:

FIGS. 1A-1C illustrates technical components of an exemplary distributed computing environment for detection of data misappropriation attempts across electronic communication platforms, in accordance with an embodiment of the invention;

FIG. 2 illustrates technical components of an exemplary misappropriation attempt engine, in accordance with an embodiment of the invention;

FIG. 3 illustrates a process flow for detection of data misappropriation attempts across electronic communication platforms, in accordance with an embodiment of the invention;

FIG. 4 illustrates a process flow for generating a misappropriation rating of the current communication based on the at least one background tactic type, in accordance with an embodiment of the invention;

FIG. 5 illustrates a process flow for training the misappropriation attempt engine using the previous outcome training data set, in accordance with an embodiment of the invention;

FIG. 6 illustrates a process flow for generating the misappropriation attempt rating of the current communication based on the current recipient account identifier, in accordance with an embodiment of the invention; and FIG. 7 illustrates a process flow for generating a misappropriation attempt rating of the current communication, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/ rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As described in further detail herein, the present invention provides a solution to the above-referenced problems in the field of technology by generating an accurate, efficient, and dynamic detection system for electronic communications across different platforms. Such a system (i.e., a detection system) may further train a misappropriation attempt engine, like that shown as machine learning model 232 of FIG. 2, to determine a likelihood that a misappropriation attempt is present in a current communication based on at least one factor which may comprise background tactic types of the sender for the current communication, the potential outcome (s) of the current communication, the recipient account that received the current communication, or the sender account that transmitted the current communication. The present invention solves this technical problem by implementing the detection system, like that shown as system 130 in FIGS. 1A-1C. For instance, the detection system acts to identify a recipient user account that has received a current communication, parse the current communication to identify at least one order (e.g., request) for the recipient user account, identify at least one potential outcome of the order, apply the misappropriation attempt engine to the current communication, and generate a misappropriation attempt rating which will identify whether a misappropriation attempt is likely in the current communication.

Accordingly, the present invention works by identifying a recipient user account, where the recipient user account has received a current communication; and parsing the current communication to identify at least one order for the recipient user account. The present invention further provides for identifying at least one potential outcome based on the at least one order for the recipient user account; determining the potential outcome comprises a misappropriation; applying a misappropriation attempt engine to the current communication; and generating, by the misappropriation attempt engine, a misappropriation attempt rating for the current communication.

What is more, the present invention provides a technical solution to a technical problem. As described herein, the technical problem includes the accurate, efficient, and dynamic detection of misappropriation attempts across electronic platforms, which is thus necessary to promote the security of electronic accounts, data, and the like. The technical solution presented herein allows for a detection system which comprises a misappropriation attempt engine tasked with detecting whether a misappropriation attempt is likely within an electronic communication (which may include those electronic communications comprising misappropriation attempts which would be undetectable otherwise). In particular, the detection system is an improvement over existing solutions to the accurate, efficient, and dynamic detection of misappropriation attempts (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for detection of data misappropriation attempts across electronic communication platforms 100, in accordance with an embodiment of the invention. As shown in FIG. 1A, the distributed computing environment 100 contemplated herein may include a system 130 (i.e., a detection system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer—or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary misappropriation attempt engine subsystem architecture 200, in accordance with an embodiment of the invention. The misappropriation attempt engine subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the misappropriation attempt engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence (AI) engines and machine learning, the quality of data and the useful information that can be derived therefrom directly affects the ability of the misappropriation attempt engine 224 to learn. The data pre-processing engine 216 may implement advanced integration and processing steps needed to prepare the data for misappropriation attempt engine execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of AI engine algorithm being used, this training data 218 may require further enrichment. For example, in supervised learning, the training data is enriched using one or more meaningful and informative labels to provide context so an AI engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI engine tuning engine 222 may be used to train a misappropriation attempt engine 224 using the training data 218 to make predictions or decisions without explicitly being programmed to do so. The misappropriation attempt engine 224 represents what was learned by the selected AI engine algorithm 220 and represents the rules, numbers, and any other algorithm-specific data structures required for classification. Selecting the right AI engine algorithm may depend on a number of different factors, such as the problem statement and the kind of output needed, type and size of the data, the available computational time, number of features and observations in the data, and/or the like. AI engine algorithms may refer to programs (math and logic) that are configured to self-adjust and perform better as they are exposed to more data. To this extent, AI engine algorithms are capable of adjusting their own parameters, given feedback on previous performance in making prediction about a dataset.

The AI engine algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable AI engine model type. Each of these types of AI engine algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the misappropriation attempt engine, the AI engine tuning engine 222 may repeatedly execute cycles of experimentation 226, testing 228, and tuning 230 to optimize the performance of the AI engine algorithm 220 and refine the results in preparation for deployment of those results for consumption or decision making. To this end, the AI engine tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained misappropriation attempt engine 232 is one whose hyperparameters are tuned and model accuracy maximized.

The trained misappropriation attempt engine 232, similar to any other software application output, can be persisted to storage, file, memory, or application, or looped back into the processing component to be reprocessed. More often, the trained misappropriation attempt engine 232 is deployed into an existing production environment to make practical business decisions based on live data 234. To this end, the misappropriation attempt engine subsystem 200 uses the inference engine 236 to make such decisions. The type of decision-making may depend upon the type of AI engine algorithm used. For example, AI engines trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, AI engines trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, AI engines that perform regression techniques may use live data 234 to predict or forecast continuous outcomes.

It will be understood that the embodiment of the misappropriation attempt engine 200 illustrated in FIG. 2 is exemplary and that other embodiments may vary. As another example, in some embodiments, the misappropriation attempt engine 200 may include more, fewer, or different components.

FIG. 3 illustrates a process flow 300 for detection of data misappropriation attempts across electronic communication platforms, in accordance with an embodiment of the invention. In some embodiments, a system (e.g., similar to one or more of the systems described herein with respect to FIGS. 1A-1C) may perform one or more of the steps of process flow 300. For example, a detection system (e.g., the system 130 described herein with respect to FIG. 1A-1C) may perform the steps of process 300.

As shown in block 302, the process flow 300 may include the step of identifying a recipient user account, wherein the recipient user account has received a current communication. By way of non-limiting example, the detection system may identify a recipient user account that has received a communication from a sender account such as an unverified sender account. For instance, an unverified sender account may comprise an identifier that closely resembles or does resemble a known sender account of the recipient account (such as an unverified sender account misappropriating an identity of a verified sender account).

In some embodiments, the detection system may identify a recipient user account by receiving an indication that the recipient user account received a new or current communication such as an electronic message communication (e.g., text message on a mobile device, e-mail, and/or the like), verbal electronic communication (e.g., phone call on a mobile device or phone device, voicemail on a mobile device or phone device, and/or the like). In some embodiments, the detection system may receive an indication from the mobile device or another device associated with the recipient user account, where the device has access to at least the current communication received by the recipient user account. In some embodiments, the detection system may make a copy of the current communication such that the detection system may parse the data of the current communication fully.

In some embodiments, the detection system may receive data from the recipient user, such as data entered and filled into text data fields on a device associated with the recipient user (e.g., a mobile device, a personal computing device, and/or the like), where the device comprises a graphical user interface configured to request additional data from the recipient user. In some embodiments, the detection system may receive data from the recipient user based on audio and video interviews, where the audio and video interviews may comprise data regarding the speech patterns of the recipient user, the tone of the recipient user's speech, and/or the like. In some embodiments, the audio and video interviews may be collected and stored by the detection system for training of at the misappropriation attempt engine, which may be trained to look for differences in recipient user behavior when the recipient user receives communications (e.g., previous threat communications, current communication(s), and/or the like).

As shown in block 304, the process flow 300 may include the step of parsing the current communication to identify at least one order for the recipient user account. In some embodiments, the detection system may parse the data of the current communication to identify at least one order made to the recipient user account, where the order is a request for the recipient associated with the recipient user account to do an activity or task. By way of non-limiting example, the activity or task of the at least one order may comprise a request to electronically "click" on a graphic, picture, phrase, universal resource locator (URL), hyperlink, and/or the like which may take the recipient user account to a secondary webpage; a request to provide information (e.g., secure information such as financial institution account information, social security numbers, addresses, authentication credentials, and/or the like); a request to conduct a resource transaction; a request to purchase resource transfer instruments (e.g., gift cards and/or the like); and/or the like. In some embodiments, the current communication may comprise a plurality of orders.

In some embodiments and where the current communication is a verbal electronic communication, the detection system may generate a text file or text data of the verbal electronic communication. By way of non-limiting example, if the recipient user associated with the recipient user account responds verbally to the verbal electronic communication, the detection system may generate a text file or text data of the verbal response from the recipient user. In some embodiments, the detection system may parse the generated text file(s) or text data to determine at least one order of the verbal electronic communication. In some embodiments, the detection system may additionally parse the verbal response (as generated as a text file or text data) from the recipient user to determine whether the at least one order was followed or accepted.

In some embodiments, the detection system may parse such data from the current communication and analyze the data to determine the meaning of the current communication itself. In some embodiments, the detection system may use a natural language processor to analyze the parsed data of the current communication. For instance, the detection system may use a natural language processor to determine which portions of the current communication comprise an order and what the order(s) comprises with respect to an activity or task. In some such embodiments, the natural language processor may be trained using previous threat communications comprising at least one order to determine the contents of the previous threat communications and current communications.

As shown in block 306, the process flow 300 may include the step of identifying at least one potential outcome based on the at least one order for the recipient user account. In some embodiments, the detection system may identify at least one potential outcome based on the at least one order provided in the current communication. Such a potential outcome may comprise a likely result if the recipient user were to accept or follow the at least one order of the current communication.

As shown in block 308, the process flow 300 may include the step of determining the potential outcome comprises a misappropriation. In some embodiments, the detection system may determine the potential outcome comprises a misappropriation based on whether a likely bad outcome would occur if the recipient user accepted or followed the order(s) of the current communication. For instance, if the current communication comprises an order that requests the recipient user provide certain secure information (e.g., such as the recipient user's social security number or authentication credentials), the detection system may determine the potential outcome to be a misappropriation of the recipient user's identity or account credentials. By way of non-limiting example, the bad outcome may comprise a misappropriation of resources (e.g., resources that belong to the recipient user account and/or resources that belong to another user account), misappropriation of data, misappropriation of information (e.g., secure information, personal information, documents, and/or the like), electronic information (e.g., electronic documents, authentication credentials used to log in to an electronic account, and/or the like), and/or the like.

In some embodiments, and where the current communication does not comprise at least one order or comprises an order that does not request a bad outcome (e.g., requests the recipient user give feedback regarding a service or resource purchased), the detection system may determine the potential outcome not to be a misappropriation or bad outcome.

In some embodiments and where the current communication comprises a plurality of orders, the detection system may determine the overall potential outcome is a misappropriation where at least one potential outcome comprises a misappropriation from the plurality of orders. In some embodiments and where the current communication comprises a plurality of orders, the detection system may determine the potential outcome of the current communication to be a misappropriation based on a compilation of the individual potential outcomes of each of the plurality of orders, where the plurality of potential outcomes for the plurality of orders is aggregated and then averaged to determine whether the overall potential outcome is likely a misappropriation for the entire current communication.

As shown in block 310, the process flow 300 may include the step of applying a misappropriation attempt engine to the current communication. In some embodiments, the detection system may apply a misappropriation attempt engine (e.g., such as that described in FIG. 2) to at least the current communication to determine whether the current communication comprises a likely misappropriation attempt. The misappropriation attempt engine and processes for training and using the misappropriation attempt engine is described in further detail below with respect to FIGS. 4, 5, 6, and 7.

As shown in block 312, the process flow 300 may include the step of generating, by the misappropriation attempt engine, a misappropriation attempt rating for the current communication. In some embodiments, the misappropriation attempt engine may generate a misappropriation attempt rating for the current communication to be a low rating, a medium rating, or a high rating.

By way of non-liming example, the low rating for the misappropriation attempt rating may indicate a low likelihood that the current communication is a misappropriation attempt. In some embodiments, the low misappropriation rating may be based on a lack of the misappropriation rating meeting a first threshold or a second threshold (which may have been predetermined by a manager of the detection system, a client of the detection system, the detection system itself based on previous threat communications, and/or the like).

By way of non-limiting example, the medium rating for the misappropriation attempt rating may indicate a medium likelihood (e.g., a likelihood which may be interpreted as being either not a misappropriation attempt or a misappropriation attempt). In some embodiments, the medium rating for the misappropriation attempt rating may be determined by the misappropriation attempt rating meeting a first threshold, but not a second threshold. As described above, the first threshold may be predetermined by at least one of a manager of the detection system, a client of the detection system, the detection system itself, and/or the like. In some embodiments, the second threshold may be predetermined by at least one of a manager of the detection system, a client of the detection system, the detection system itself, and/or the like.

By way of non-limiting example, the high rating for the misappropriation attempt rating may indicate a high likelihood (e.g., a likelihood which may be interpreted as a very likely misappropriation attempt). In some embodiments, the high rating for the misappropriation attempt rating may be determined by the misappropriation attempt rating meeting a first threshold and a second threshold. As described above, the first threshold may be predetermined by at least one of a manager of the detection system, a client of the detection system, the detection system itself, and/or the like. In some embodiments, the second threshold may be predetermined by at least one of a manager of the detection system, a client of the detection system, the detection system itself, and/or the like.

FIG. 4 illustrates a process flow 400 for generating a misappropriation rating of the current communication based on the at least one background tactic type, in accordance with an embodiment of the invention. In some embodiments, a system (e.g., similar to one or more of the systems described herein with respect to FIGS. 1A-1C) may perform one or more of the steps of process flow 400. For example, a detection system (e.g., the system 130 described herein with respect to FIG. 1A-1C) may perform the steps of process 400.

As shown in block 402, the process 400 may include the step of collecting a set of previous threat communications, wherein the set of previous threat communications comprise at least one background tactic type. In some embodiments, the detection system may collect a set of previous threat communications (e.g., at least one threat communication or a plurality of previous threat communications which were determined to be a misappropriation attempt). By way of non-limiting example, the set of previous threat communications may be collected based on a predetermined time period where the predetermined time period may comprise a period of a specified date, a specified week, a specified month, a specified year, a specified couple of years, and/or the like.

In some embodiments, the detection system may collect the set of previous threat communications based on the available previous threat communications (e.g., all the previous threat communications stored within one or more databases), such that the detection system can be trained using all of the previous threat communications known. In some embodiments, the detection system may collect the set of previous threat communications only for a specific client (e.g., the specific client associated with the current communication), such that the detection system and its misappropriation attempt engine is trained to be client specific.

In some embodiments, the detection system may collect the set of previous threat communications by collecting the set of previous threat communications from a database of communications (e.g., such as a database stored by a client associated with the detection system, a manager of the detection system, and/or the like). The database of communications may or may not indicate which previous communications are threats (e.g., misappropriation attempts). However, the detection system may determine itself which previous communications are likely previous threat communications when training its misappropriation attempt engine, which may comprise a feedback loop where a manager, client, and/or the like of the detection system can affirm or deny that each previous communication is in fact a previous threat communication. In this manner, the detection system and its misappropriation attempt engine may be trained using a plurality of previous threat communications.

In some embodiments, the set of previous threat communications may comprise at least one background tactic type. For instance, each of the previous threat communications may each comprise at least one background tactic type used by the misappropriation attempt engine to determine a previous communication is a threat (e.g., misappropriation attempt). In some embodiments, the background tactic type may comprise at least one of a threat communication marker, a threat communication tone, a threat communication language, a threat communication noise, or a threat communication request type.

The treat communication marker of the background tactic type may comprise at least one marker of a misappropriation attempt such as misspelled words (e.g., certain misspelled words commonly found in misappropriation attempts), incorrect punctuation, incorrect domain names (e.g., misspelling of domain names, email addresses, and/or the like), and/or the like. The threat communication tone may comprise at least one tone of a misappropriation attempt such as a tone of urgency (e.g., requesting the order of the communication be followed immediately), and/or the like. The communication language may comprise at least one language of a misappropriation attempt such as the use of specific words (e.g., "immediate," "immediately," "link," "account number," "authenticate," "password," "social security number," and/or the like). The threat communication noise may comprise at least one background noise of the communication which may be used to indicate a likely misappropriation attempt such as the background noise comprising multiple speakers (e.g., multiple speakers speaking all at once), multiple languages of the multiple speakers (e.g., multiple speakers speaking different languages all at once), and/or the like. The threat communication request type may comprise at least one request type which may be used to indicate a likely misappropriation attempt such as a request type of requesting secure or private information (e.g., requesting a social security number, account number, password/passcode, and/or the like), requesting the selection or clicking of a hyperlink from an untrusted source, requesting the attaching and sending of secure documents or data, and/or the like.

As shown in block 404, the process flow 400 may include the step of creating a background tactic training set comprising the collected set of previous threat communications. In some embodiments, the detection system may create a background tactic training set by grouping the set of previous threat communications into a training data set for input into the misappropriation attempt engine. By way of non-limiting example, the background tactic training set may comprise each of the background tactic types for the set of previous threat communications. In this manner, the misappropriation attempt engine may be trained using the background tactic types of the previous threat communications. By way of non-limiting example, the background tactic types of the previous threat communications may be aggregated with the previous threat communications to create the background tactic training data set.

As shown in block 406, the process flow 400 may include the step of training the misappropriation attempt engine using the background tactic training data set. In some embodiments, the detection system may input the background tactic training data set into the misappropriation attempt engine to train the misappropriation attempt engine. As detailed above, the misappropriation attempt engine may be further trained through the use of a feedback loop, which may be used by a manager of the detection system, a client of the detection system, and/or the like to confirm or deny which previous communications are in fact previous threat communications (e.g., are likely a misappropriation attempt—which could be considered as having a medium or high rating for the misappropriation attempt rating).

As shown in block 408, the process flow 400 may include the step of receiving at least one current background tactic type associated with the current communication. In some embodiments and at least once the misappropriation attempt engine has been initially trained, the detection system may comprise receiving the current communication and at least one associated current background tactic type. For instance, the current communication may comprise at least one (or more) current background tactic types such as a threat communication marker, a threat communication tone, a threat communication language, a threat communication noise, a threat communication request type, and/or the like. Each current communication received by the detection system and/or identified by the detection system may likewise comprise a current background tactic type which is similar or the same to the background tactic types used to train the misappropriation attempt engine.

As shown in block 410, the process flow 400 may include the step of applying the at least one current background tactic type to the misappropriation attempt engine. In some embodiments, the detection system may input the at least one current background tactic type into the (trained) misappropriation attempt engine for the misappropriation attempt engine to output a misappropriation attempt rating for the current communication.

As shown in block 412, the process flow 400 may include the step of generating, by the misappropriation attempt engine, the misappropriation attempt rating of the current communication based on the at least one background tactic type. By way of non-limiting example, the detection system may generate the misappropriation attempt rating based at least on the current background tactic type. In some embodiments, the misappropriation attempt rating may be based on a plurality of factors associated with the current communication, where the plurality of factors may comprise at least one current background tactic type, an outcome type (which is discussed in further detail below with respect to FIG. 5), the current recipient account identifier (which is discussed in further detail below with respect to FIG. 6), and/or an authentication received from a verified sender user account (which is discussed in further detail below with respect to FIG. 7). In this manner, the detection system may generate the misappropriation attempt rating based on an aggregate of the above-listed factors and each of their associated misappropriation attempt ratings for the current communication, to determine an aggregate misappropriation attempt rating.

FIG. 5 illustrates a process flow 500 for training the misappropriation attempt engine using the previous outcome training data set, in accordance with an embodiment of the invention. In some embodiments, a system (e.g., similar to one or more of the systems described herein with respect to FIGS. 1A-1C) may perform one or more of the steps of process flow 500. For example, a detection system (e.g., the system 130 described herein with respect to FIG. 1A-1C) may perform the steps of process 500.

As shown in block 502, the process 500 may include the step of collecting a set of previous threat communications, wherein the set of previous threat communications comprise at least one previous order and at least one previous outcome. By way of non-limiting example, the detection system may collect a set of previous threat communications in the same or similar manner as described above with respect to FIG. 4. In some embodiments, the detection system may additionally collect the at least one previous order and at least one previous outcome for each of the collected previous threat communications, where each previous threat communication may comprise at least one previous order (e.g., a previous request for the recipient of the previous threat communication) and at least one previous outcome (e.g., an outcome if the recipient of the previous threat communication were to follow or accept the previous order).

As shown in block 504, the process 500 may include the step of creating a previous outcome training data set comprising the collected set of previous threat communications. By way of non-limiting example, the detection system may create a previous outcome training data set by aggregating the previous threat communications, the previous order(s) and the previous outcome(s) to train the misappropriation attempt engine. The misappropriation attempt engine may be trained to determine, for future communications (e.g., such as a current communication) what an outcome of a future order (e.g., current order) may be and whether the outcome of the future order is likely a misappropriation attempt.

As shown in block 506, the process 500 may include the step of training the misappropriation attempt engine using the previous outcome training data set. In some embodiments, the detection system may train the misappropriation attempt engine by inputting the previous outcome training data set into the misappropriation attempt engine. In some embodiments, the misappropriation attempt engine may comprise a feedback loop where a manager of the detection system, a client of the detection system, and/or the like, may confirm or deny whether the previous communication is a previous threat communication based on the previous order and/or previous outcome.

FIG. 6 illustrates a process flow 600 for generating the misappropriation attempt rating of the current communication based on the current recipient account identifier, in accordance with an embodiment of the invention. In some embodiments, a system (e.g., similar to one or more of the systems described herein with respect to FIGS. 1A-1C) may perform one or more of the steps of process flow 600. For example, a detection system (e.g., the system 130 described herein with respect to FIG. 1A-1C) may perform the steps of process 600.

As shown in block 602, the process flow 600 may include the step of collecting a set of previous recipient account identifiers associated with a set of previous threat communications. By way of non-limiting example, the detection system may collect a set of previous recipient account identifiers when the set of previous threat communications are received and/or collected. For instance, and upon receiving the set of previous threat communications, the set of previous threat communications may comprise data regarding the previous recipient account identifiers for which the previous threat communications were transmitted to. In this manner, the detection system may determine which recipient accounts received the previous threat communications. By way of non-limiting example, the set of previous threat communications may be received and/or collected in the same or similar manner as that described above with respect to FIG. 4.

In some embodiments, the set of previous threat communications which comprises data regarding the previous recipient account identifiers may further comprise recipient account resource transactions. In this manner, the detection system may comprise a historical record of each of the recipient accounts that received previous threat communications, along with each recipient accounts' transaction records. Such data records of previous resource transactions may be used by the detection system to determine a likelihood that a particular recipient user is more likely to receive a threat communication, is more likely to accept an order of a threat communication, and/or the like. For instance, and where the order of the threat communication comprises a request for the recipient user to purchase and/or complete a particular resource transaction, and where the recipient user does actually complete the particular resource transaction (as shown by the record or previous resource transactions), the detection system may determine the recipient user may complete another order of a current communication if requested.

In some embodiments, the detection system may receive and/or collect specific inferences regarding each recipient user account's preferences. For instance, and in some embodiments, the detection system may receive data (e.g., based on collection of all recipient user accounts' interactions, based on particular interactions when receiving communications, and/or the like), which may comprise data regarding particular icons (e.g., images, emoticons, and/or the like) which are commonly used by a particular recipient user account; data regarding particular preferences (e.g., facts regarding the recipient user, favorite food of the recipient user, favorite animals of the recipient user, and/or the like). By way of non-limiting example, such preferences of each particular recipient user may be used by the detection system to determine whether a current communication received by a particular recipient user is likely to be followed (e.g., where the current communication comprises a preference of the recipient user, the recipient user may be more likely to accept an order of the current communication).

In some embodiments, the detection system may additionally use the preferences for each recipient user to determine whether preferences have changed and/or been altered for each recipient user. By way of non-limiting example, and where a recipient user and their associated tracked preferences (e.g., the preferences of the recipient user which are tracked daily, weekly, monthly, and/or the like) may be used by the detection system to determine whether the recipient user may be more likely to be vulnerable to accept an order of the current communication. For instance, the detection system may determine a preference has changed for a recipient account (e.g., the recipient user has recently changed from using a happy image as a preference in their communications to a sad image in their communications) and may determine that the recipient user's emotions have recently changed, where such emotions may be a good indicator that the recipient user is more vulnerable. In some embodiments, the detection system may determine the change in preferences is short-term and upon the recipient user returning to previous (e.g., preferences that indicate the recipient user is not vulnerable), the detection system may determine that the recipient user is likely no longer vulnerable to threat communications.

As shown in block 604, the process flow 600 may include the step of creating a recipient account threat training data set comprising the collected set of previous recipient account identifiers. In some embodiments, the detection system may create the recipient account threat training data set comprising the set of previous recipient account identifiers associated with the previous threat communications.

As shown in block 606, the process flow 600 may include the step of training the misappropriation attempt engine using the recipient account threat training data set. By way of non-limiting example, the detection system may input the recipient account threat training data set into the misappropriation attempt engine in order to train the misappropriation attempt engine to look out for certain recipient account identifiers that may be likely to receive communications comprising misappropriation attempts in the future. By way of non-limiting example, the detection system may be trained to identify which recipient account identifiers may be likely to receive communications comprising misappropriation attempts by being trained with the recipient account threat training data set, where the recipient account threat training data set may comprise data regarding each recipient account from the previous threat communications (e.g., data regarding the time of life of each recipient, and other such characteristics that may lead to the recipient accounts being more likely to receive misappropriation attempts). Based on such data of the recipient account identifiers in the recipient account threat training data set, the detection system may be trained to look for similar characteristics of the recipient(s) for the current communication(s), and where there are similar characteristics, the detection system may determine the current communication is likely a misappropriation (e.g., the misappropriation attempt rating is medium and/or high).

As shown in block 608, the process flow 600 may include the step of identifying a current recipient account identifier based on the recipient user account associated with the current communication. By way of non-limiting example, the detection system may identify a current recipient account identifier where the associated current recipient account received the current communication. In some embodiments, the detection system may identify the current recipient account identifier of the current communication from a network associated with the current communication (e.g., network 110 of FIGS. 1A-1C), which may identify where the current communication is to be transmitted to.

As shown in block 610, the process flow 600 may include the step of applying the current recipient account identifier to the misappropriation attempt engine. In some embodiments, the detection system may apply and/or input the current recipient account identifier to the misappropriation attempt engine. In this manner, the misappropriation attempt engine may use the current recipient account identifier (and its associated data, which may comprise the current recipient's characteristics, such as the time of life of the recipient) to identify whether the current communication likely comprises a misappropriation attempt.

As shown in block 612, the process flow 600 may include the step of generating, by the misappropriation attempt engine, the misappropriation attempt rating of the current communication based on the current recipient account identifier. In some embodiments and based on the application of the current recipient account identifier to the misappropriation attempt engine, the detection system may generate the misappropriation attempt rating to show whether the current communication likely comprises a misappropriation attempt. Similar to the process described above with respect to FIGS. 3, 4, and 5, the detection system may have predetermined thresholds (e.g., a first threshold and a second threshold) for which the misappropriation rating may meet in order to determine whether a misappropriation attempt is likely present. Based on the current recipient account identifier and the trained misappropriation attempt engine, the detection system may determine the recipient account is likely to receive misappropriation attempts at a higher rate than other recipient accounts (which may be due to the time of life of the recipient user and other such characteristics), and based on this higher rate of receiving misappropriation attempts, the detection system may determine the current communication is likewise a misappropriation attempt.

FIG. 7 illustrates a process flow 700 for generating a misappropriation attempt rating of the current communication, in accordance with an embodiment of the invention. In some embodiments, a system (e.g., similar to one or more of the systems described herein with respect to FIGS. 1A-1C) may perform one or more of the steps of process flow 700. For example, a detection system (e.g., the system 130 described herein with respect to FIG. 1A-1C) may perform the steps of process 700.

As shown in block 702, the process flow 700 may include the step of collecting a set of previous unverified sender account identifiers associated with a set of previous threat communications. By way of non-limiting example, the detection system may collect the set of previous unverified sender account identifiers based on the set of previous threat communications, where the set of previous unverified sender account identifiers are the sender accounts associated with each of the transmitted previous threat communications. In some embodiments, the previous unverified sender account identifiers are associated with the sender accounts which sent the previous threat communications, where the unverified sender account identifier may closely resemble or be identical to a verified sender account for which the recipient knows. For instance, the unverified sender account identifier (e.g., an email address of the unverified sender account) may resemble a verified sender account identifier (e.g., an email address of an account for which the recipient knows, such as a manager of the recipient account's employer, an email associated with a financial institution, and/or the like). The detection system, when collecting the set of previous threat communications (e.g., in a manner like that described above with respect to FIG. 4) may additionally collect the set of previous recipient account identifiers associated with each of the previous threat communications. By way of non-limiting example, the detection system may store the collected set of previous threat communications and its associated set of previous recipient account identifiers within a repository or database, such as the memory 104 or 154, storage device 106, and/or the like of FIGS. 1A-1C.

As shown in block 704, the process flow 700 may include the step of creating a sender account threat training data set comprising the collected set of previous unverified sender account identifiers. In some embodiments, the detection system may create a sender account threat training data set based on the collected set of previous unverified sender account identifiers which were determined to be associated with a previous threat communication (a misappropriation attempt). The sender account threat training data set may be input into the misappropriation attempt engine in order to train the misappropriation attempt engine. In this manner, the misappropriation attempt engine may be trained to determine a likely misappropriation attempt based on the sender account identifier for which a current communication was sent.

As shown in block 706, the process flow 700 may include the step of training the misappropriation attempt engine using the sender account threat training data set. In some embodiments, the detection system may train the misappropriation attempt engine by inputting the sender account threat training data set into the misappropriation attempt engine. By way of non-limiting example, the misappropriation attempt engine may further be trained as it identifies future communications (e.g., such as the current communication) as likely misappropriations. In this manner, the misappropriation attempt engine may continuously be trained.

As shown in block 708, the process flow 700 may include the step of identifying a current unverified sender account identifier associated with the current communication. In some embodiments, the detection system may identify the current unverified sender account identifier from the current communication by identifying where the current communication was transmitted from. For instance, the detection system may retrieve data regarding the current communication from a network associated with the current communication (such as network 110 of FIGS. 1A-1C), where the data associated with the current communication may comprise at least an unverified sender account identifier from which the current communication was generated and/or transmitted from.

In some embodiments and based on the identification of the current unverified sender account identifier, the detection system may determine a verified sender user account that the unverified sender account identifier is mimicking and/or attempting to appear identical to. For instance, the current unverified sender account associated with the unverified sender account identifier may comprise an icon, account name, email address, and/or the like which closely resembles a known account of the recipient account (such as an account known to the recipient account like a manager's/ employer's account). In this manner, the recipient account user may not notice that the unverified sender account is actually different than the known account the unverified sender account may be attempting to replicate.

As shown in block 710, the process flow 700 may include the step of transmitting an authentication request to a verified sender user account associated with the unverified sender account identifier. In some embodiments, the detection system may transmit an authentication request to the verified sender account that the unverified sender account is attempting to replicate. In this manner, the detection system may verify whether the unverified sender account is trustworthy and is likely not a misappropriation attempt (where the verified sender account verifies that the unverified sender account is associated with the verified sender account and may be trusted with a positive response to the unverified sender account). In some embodiments, the authentication request may comprise a request for the verified sender account to complete an order (e.g., click on a link, indicate the unverified sender account is trustworthy by responding "yes" in an electronic communication, and/or the like).

As shown in block 712, the process flow 700 may include the step of receiving an authentication response from the verified sender user account. In some embodiments, the detection system may receive an authentication response comprising an indication that the unverified sender account is trusted from the verified sender user account where the authentication response comprises the verified sender user account's acceptance or agreeing to follow the order (e.g., clicking the link for verification, responding "yes," or another positive response, and/or the like). In some embodiments, the detection system may receive an authentication response comprising an indication that the unverified sender account is not trusted from the verified sender user account where the authentication response comprises the verified sender user account's lack of acceptance or lack of agreement to follow the order (e.g., failing to click the link for verification, responding "no," or another negative response, and/or the like).

As shown in block 714, the process flow 700 may include the step of generating, based on the authentication response from the verified sender user account, a misappropriation attempt rating of the current communication. In some embodiments, the detection system may generate a misappropriation attempt rating of the current communication based at least on the authentication response from the verified sender user account regarding the current unverified sender account identifier. In some embodiments, the detection system may determine the current communication is likely a misappropriation (e.g., comprises a high and/or medium misappropriation attempt rating) when the authentication response comprises an indication that the unverified sender account is not trusted. In some embodiments, the detection system may determine the current communication is likely not a misappropriation (e.g., comprises a low misappropriation attempt rating) when the authentication response comprises an indication that the unverified sender account is trusted.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for detection of data misappropriation attempts across electronic communication platforms, the system comprising:

a memory device with computer-readable program code stored thereon;

at least one processing device operatively coupled to the memory device and at least one communication device, wherein executing the computer-readable program code is configured to cause the at least one processing device to:

identify a recipient user account and an associated recipient account identifier, wherein the recipient user account has received a current communication;

identify recipient account characteristics associated with the recipient account identifier;

parse the current communication to identify at least one order for the recipient user account;

identify at least one potential outcome based on the at least one order for the recipient user account;

determine the potential outcome comprises a misappropriation;

collect a set of previous recipient account identifiers associated with a set of previous threat communications and a set of previous recipient account characteristics associated with the set of previous recipient account identifiers;

create a recipient account threat training data set comprising the collected set of previous recipient account identifiers and the set of previous recipient account characteristics;

train a misappropriation attempt engine using the recipient account threat training data set;

apply the trained misappropriation attempt engine to the current communication, wherein the application of the trained misappropriation attempt engine comprises an analysis of the recipient account characteristics compared to the set of previous recipient account characteristics;

determine, by the trained misappropriation attempt engine, one or more of the recipient account characteristics matches at least one of the set of previous recipient account characteristics; and generate, by the misappropriation attempt engine, a misappropriation attempt rating for the current communication based on the potential outcome comprising the misappropriation and the matching, using the trained misappropriation attempt engine, of the one or more recipient account characteristics with at least one of the set of previous recipient account characteristics.

2. The system of claim 1, wherein the current communication comprises at least one of a verbal electronic communication or an electronic message communication.

3. The system of claim 1, wherein the determination the potential outcome comprises a misappropriation further comprises an acceptance by the recipient user account of the at least one order of the current communication.

4. The system of claim 1, wherein the processing device is further configured to:

collect a set of previous threat communications, wherein the set of previous threat communications comprise at least one background tactic type;

create a background tactic training data set comprising the collected set of previous threat communications; and train the misappropriation attempt engine using the background tactic training data set.

5. The system of claim 4, wherein the at least one background tactic type comprises at least one of a threat communication marker, a threat communication tone, a threat communication language, a threat communication noise, or a threat communication request type.

6. The system of claim 5, wherein the processing device is further configured to:

receive at least one current background tactic type associated with the current communication;

apply the at least one current background tactic type to the misappropriation attempt engine; and generate, by the misappropriation attempt engine, the misappropriation attempt rating of the current communication based on the at least one current background tactic type.

7. The system of claim 1, wherein the processing device is further configured to:

collect a set of previous threat communications, wherein the set of previous threat communications comprise at least one previous order and at least one previous outcome;

create a previous outcome training data set comprising the collected set of previous threat communications; and train the misappropriation attempt engine with the previous outcome training data set.

8. The system of claim 1, wherein the processing device is further configured to:

identify a current recipient account identifier based on the recipient user account associated with the current communication;

apply the current recipient account identifier to the misappropriation attempt engine; and generate, by the misappropriation attempt engine, the misappropriation attempt rating of the current communication based on the current recipient account identifier.

9. The system of claim 1, wherein the processing device is further configured to:

collect a set of previous unverified sender account identifiers associated with a set of previous threat communications;

create a sender account threat training data set comprising the collected set of previous unverified sender account identifiers; and train the misappropriation attempt engine using the sender account threat training data set.

10. The system of claim 9, wherein the processing device is further configured to:

identify a current unverified sender account identifier associated with the current communication;

transmit an authentication request to a verified sender user account associated with the unverified sender account identifier;

receive an authentication response from the verified sender user account; and generate, based on the authentication response from the verified sender user account, a misappropriation attempt rating of the current communication.

11. The system of claim 10, wherein the misappropriation attempt rating of the current communication comprises a high rating, in an instance the authentication response comprises a negative response.

12. The system of claim 10, wherein the misappropriation attempt rating of the current communication comprises a low rating, in an instance the authentication response comprises a positive response.

13. A computer program product for detection of data misappropriation attempts across electronic communication platforms, wherein the computer program product comprises at least one non-transitory computer-readable medium having computer-readable program code portions embodied therein, the computer-readable program code portions which when executed by a processing device are configured to cause the processing device to:

identify a recipient user account and an associated recipient account identifier, wherein the recipient user account has received a current communication;

identify recipient account characteristics associated with the recipient account identifier;

parse the current communication to identify at least one order for the recipient user account;

identify at least one potential outcome based on the at least one order for the recipient user account;

determine the potential outcome comprises a misappropriation;

collect a set of previous recipient account identifiers associated with a set of previous threat communications and a set of previous recipient account characteristics associated with the set of previous recipient account identifiers;

create a recipient account threat training data set comprising the collected set of previous recipient account identifiers and the set of previous recipient account characteristics;

train a misappropriation attempt engine using the recipient account threat training data set;

apply the trained misappropriation attempt engine to the current communication, wherein the application of the trained misappropriation attempt engine comprises an analysis of the recipient account characteristics compared to the set of previous recipient account characteristics;

determine, by the trained misappropriation attempt engine, one or more of the recipient account characteristics matches at least one of the set of previous recipient account characteristics; and generate, by the misappropriation attempt engine, a misappropriation attempt rating for the current communication based on the potential outcome comprising the misappropriation and the matching, using the trained misappropriation attempt engine, of the one or more recipient account characteristics with at least one of the set of previous recipient account characteristics.

14. The computer program product of claim 13, wherein the current communication comprises at least one of a verbal electronic communication or an electronic message communication.

15. The computer program product of claim 13, wherein the determination the potential outcome comprises a misappropriation further comprises an acceptance by the recipient user account of the at least one order of the current communication.

16. The computer program product of claim 13, wherein the processing device is further configured to cause the processing device to:

collect a set of previous threat communications, wherein the set of previous threat communications comprise at least one background tactic type;

create a background tactic training data set comprising the collected set of previous threat communications; and train the misappropriation attempt engine using the background tactic training data set.

17. A computer-implemented method for detection of data misappropriation attempts across electronic communication platforms, the computer-implemented method comprising:

identifying a recipient user account and an associated recipient account identifier, wherein the recipient user account has received a current communication;

identifying recipient account characteristics associated with the recipient account identifier;

parsing the current communication to identify at least one order for the recipient user account;

identifying at least one potential outcome based on the at least one order for the recipient user account;

determining the potential outcome comprises a misappropriation;

collecting a set of previous recipient account identifiers associated with a set of previous threat communications and a set of previous recipient account characteristics associated with the set of previous recipient account identifiers;

creating a recipient account threat training data set comprising the collected set of previous recipient account identifiers and the set of previous recipient account characteristics;

training a misappropriation attempt engine using the recipient account threat training data set;

applying the trained misappropriation attempt engine to the current communication, wherein the application of the trained misappropriation attempt engine comprises an analysis of the recipient account characteristics compared to the set of previous recipient account characteristics;

determining, by the trained misappropriation attempt engine, one or more of the recipient account characteristics matches at least one of the set of previous recipient account characteristics; and generating, by the misappropriation attempt engine, a misappropriation attempt rating for the current communication based on the potential outcome comprising the misappropriation and the matching, using the trained misappropriation attempt engine, of the one or more recipient account characteristics with at least one of the set of previous recipient account characteristics.

18. The computer-implemented method of claim 17, wherein the current communication comprises at least one of a verbal electronic communication or an electronic message communication.

19. The computer-implemented method of claim 17, wherein the determination the potential outcome comprises a misappropriation further comprises an acceptance by the recipient user account of the at least one order of the current communication.

* * * * *